(No Model.) 2 Sheets—Sheet 1.
G. D. YOUNG.
BICYCLE RACK.
No. 557,470. Patented Mar. 31, 1896.
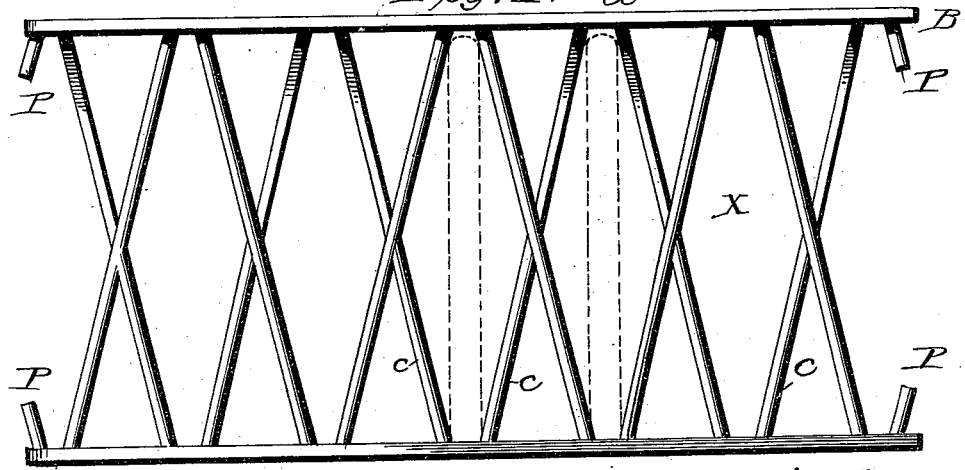
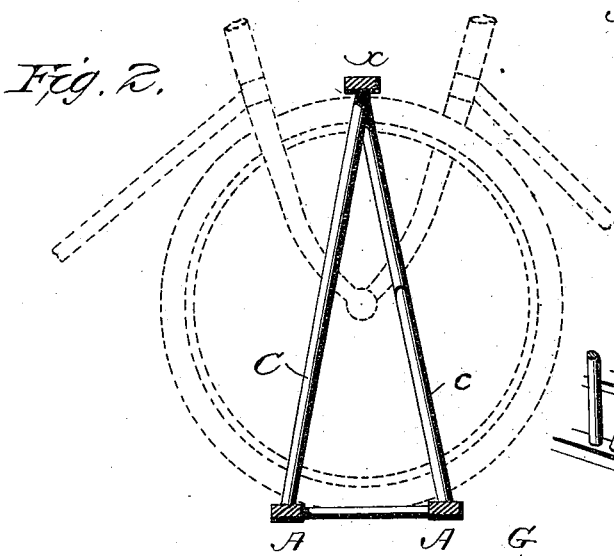
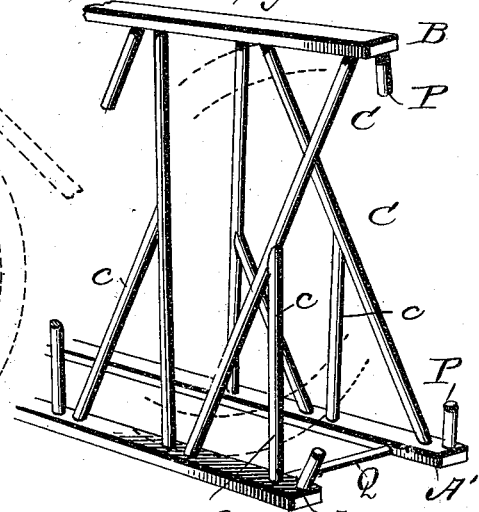
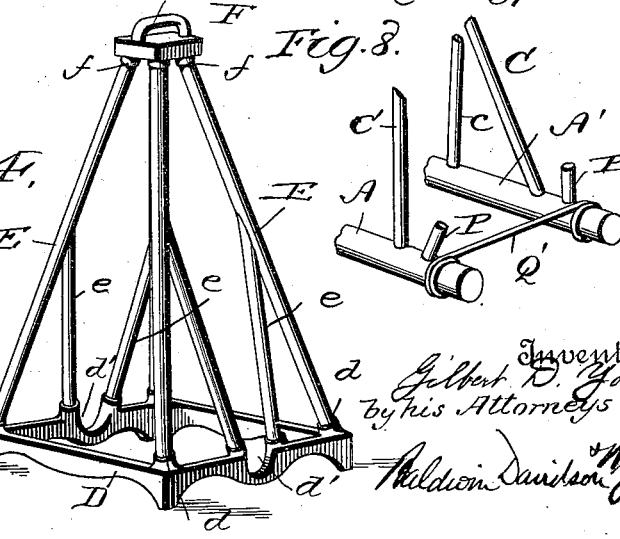
Witnesses
Inventor
Gilbert D. Young
by his Attorneys (No Model.) 2 Sheets—Sheet 2.
G. D. YOUNG.
BICYCLE RACK.
No. 557,470. Patented Mar. 31, 1896.
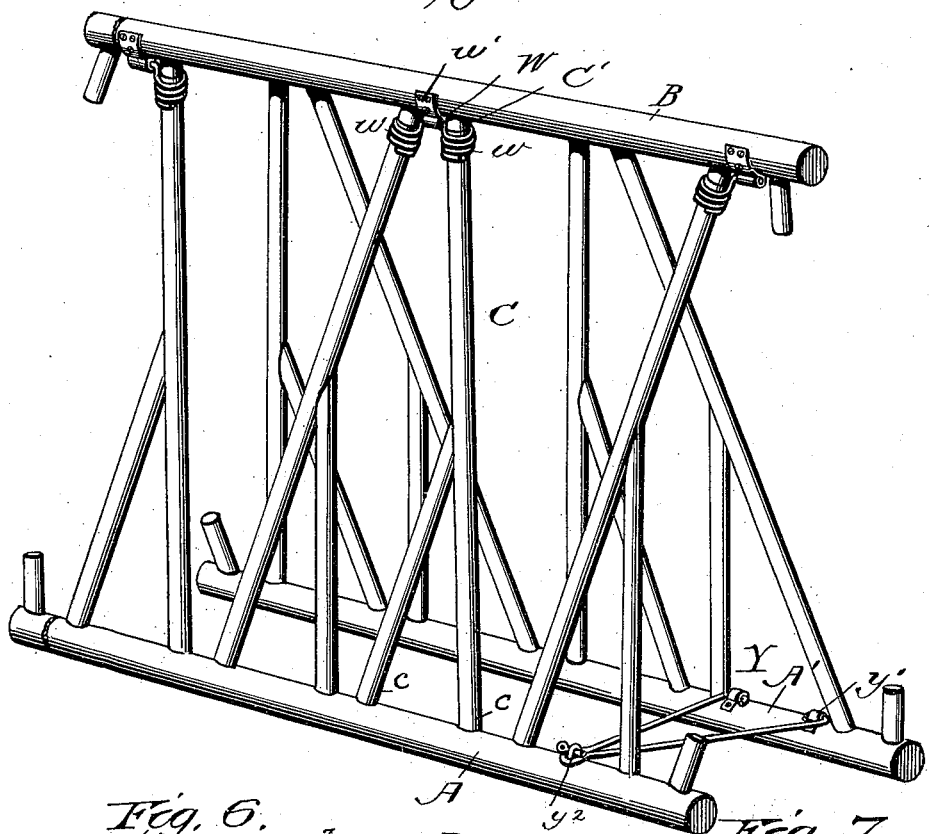
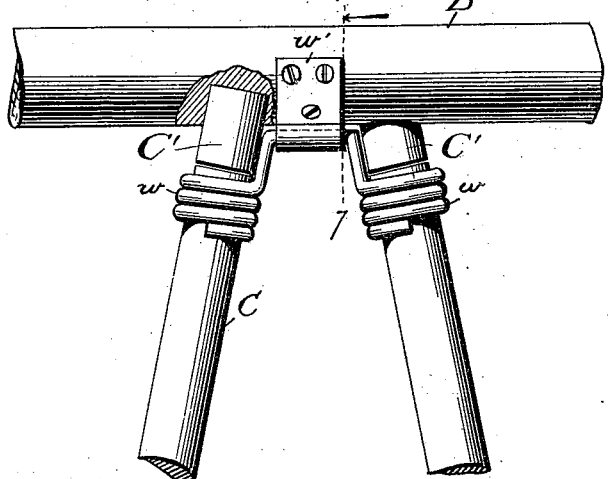
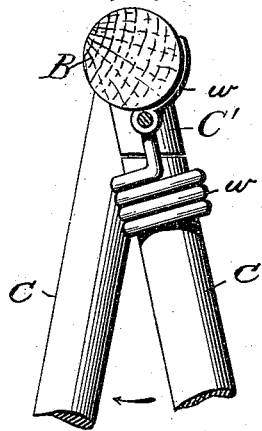

UNITED STATES PATENT OFFICE.

GILBERT D. YOUNG, OF MORRISTOWN, NEW JERSEY, ASSIGNOR OF ONE-HALF TO WILBUR F. DAY, OF SAME PLACE.

BICYCLE-RACK.

SPECIFICATION forming part of Letters Patent No. 557,470, dated March 31, 1896.

Application filed July 16, 1895. Serial No. 556,175. (No model.)

*To all whom it may concern:*

Be it known that I, GILBERT D. YOUNG, a citizen of the United States, residing at Morristown, in the county of Morris and State of New Jersey, have invented certain new and useful Improvements in Bicycle-Racks, of which the following is a specification.

The object of my invention is to provide an improved rack for holding one or more bicycles in an upright position.

In order to make the rack compact, I form it in such manner as to engage one wheel only of the bicycle, hold it securely in an upright position, and thus support the entire machine in such manner that it may be readily removed when required for use.

My improved bicycle-rack is arranged to engage the top of the wheel on opposite sides at two points, and it engages the bottom of the wheel on opposite sides at four points, just over that part of the frame on which the wheel rests. By this arrangement the wheel, while being held in an upright position, is prevented from rolling or moving longitudinally away from the rack. I also, in accordance with one part of my invention, provide a rack having the essential characteristics above named which may be readily folded when not in use or for transportation.

In the accompanying drawings, illustrating my invention, Figure 1 shows a front elevation of my improved bicycle stand or rack, and by dotted lines shows how the wheels of bicycles are held in the rack. Fig. 2 shows a cross-section of the rack, and by dotted lines shows how two bicycles on opposite sides of the rack are supported. Fig. 3 shows a perspective view of one end of the rack. Fig. 4 shows a perspective view of a rack adapted to support a single bicycle. Fig. 5 shows a modification of the rack so constructed that it may be folded. Figs. 6 and 7 are detail views showing the manner of connecting the various parts so that they may be folded. Fig. 8 is a detail view in perspective of a modified way of connecting the bottom rails of the rack.

The rack or stand shown in Figs. 1, 2, and 3 is composed of two parallel rails A A', constituting the base of the rack, and a single top rail B, located in a vertical plane centrally between the rails A A'. The top rail is connected to the bottom rails by rods C, extending alternately from the rail B to the rails A A' in an inclined or diagonal direction, both longitudinally of the rack and transversely thereto, crossing each other, as shown, and each braced by the short rod $c$, which is also inclined in such manner that in front elevation the rack presents a series of diamond-shaped openings X, sufficiently high to receive the wheel of a bicycle, the ends of the rods being so arranged at $x$ that while permitting the wheel to enter the openings they grasp the tires and prevent the wheels from moving while they are held in an upright position.

At the top each wheel is held between the converging ends of two rods C, while at the bottom it is held between the lower ends of the rods C and the brace-rods $c$.

As shown in Figs. 1 and 2, each end of the rack is provided with short diagonally-arranged pegs or pins P, which, in connection with the adjacent rods C, afford means for supporting two additional bicycles. The bottom rails A A' may be connected at each end by rods Q, as shown in Fig. 3, or by wires Q', as shown in Fig. 8. Fig. 8 also shows how the rails may be made circular in cross-section instead of angular. The wire Q' is coiled at each end, as shown, and is forced onto the rails A A' against the pegs P, grasping the rails tightly and preventing any tendency to split. The wires Q' may be removed, if desired, in order that the racks may be closely packed for transportation.

In use the bicycles are preferably inserted into the rack from opposite sides, as indicated in Fig. 2.

Fig. 4 shows a rack adapted to support a single bicycle. The base D may be a single casting formed with sockets $d$ to receive the rods E $e$. The top piece F may also be a single casting formed with sockets $f$ for the rods and a handle G. The four rods E extend from the top piece to the four corners of the base, while the brace-rods $e$ are connected with the rods E about midway between their upper and lower ends, their lower ends being arranged a suitable distance apart to permit of the insertion of a wheel. The base is hollow and is formed on opposite sides between the ends of the rods e with recesses d', adapted to receive the wheel.

In Fig. 5 I have shown a rack constructed in accordance with my invention adapted to be folded. The rails A A' are round. The rods C and c are arranged in substantially the same way as those shown in Fig. 1, but at the top the rods C on one side are hinged to the top rail B.

Various ways may be adopted for providing a hinge connection between the rods C and the rail B. As shown, the rods C on one side of the rack terminate a short distance below the rail and are secured to the coils w of a wire W, which is hinged in a socket w' on the rail A. Short pieces C', corresponding with the rods C, are secured to the top of the rail A and form continuations of the rods C, but permit the rods to move when the rack is folded. All of the rods on one side of the rack may be connected to the top rail in a similar way.

In order to hold the rails A A' in a distended position, I employ, preferably at each end of the rack, a brace Y, hinged to one rail at y' and connected to the opposite rail at y² by a pin and staple.

Fig. 5 shows the rack distended and the braces arranged to connect the two bottom rails of the rack. After disengaging the brace Y at y² it may be turned upon its hinges y', and the rack may then be folded into convenient shape for storage or transportation.

I claim as my invention—

1. A bicycle-rack comprising the top and bottom pieces, the rods converging at the top and diverging from the top downward to the bottom, and braces converging at the bottom piece to which they are secured, and connected to the rods between their upper and lower ends, forming with the rods a diamond-shaped opening, the arrangement being such that a wheel may be grasped at top and bottom, while the central portion or hub of the wheel may extend into or through the large portion of the diamond-shaped opening.

2. A bicycle-rack comprising the top and bottom pieces, the rods converging at the top and bottom of the rack and diverging from the top and bottom pieces toward the center of the rack, forming an enlarged opening midway between the top and bottom pieces, which opening is contracted at top and bottom, for the purpose specified.

3. The combination of the top rail, the two bottom rails, the rods arranged in pairs, each pair having its upper ends connected to the top rail close together, while the lower ends, which are spread apart, are connected to one of the bottom rails, and braces for each pair of rods having their lower ends arranged close together and connected to the bottom rails, while their upper ends are spread apart and secured to the rods midway between their upper and lower ends.

4. The combination of a single top rail, two bottom rails, a series of pairs of rods connected to the top rail, and also connected to one of the bottom rails, and another series of pairs of rods connected to the top rail and also connected at their lower ends to the other bottom rail, all of said rods being arranged diagonally lengthwise of the rack and also inclined toward the front and back of the rack, the rods of the back set crossing the rods of the front set, and inclined pegs at the ends of the rack to take the place of rods.

5. The combination of the top rail, the bottom rails, the inclined rods connecting the top and bottom rails and forming diamond-shaped openings, as described, hinged connections between the top rail and the rods and removable braces connecting the two bottom rails for holding them apart, substantially as described.

6. A bicycle-rack comprising a top rail, two bottom rails, a series of pairs of rods secured to the top rail and to the front bottom rail, said rods being inclined alternately in opposite directions sidewise and also inclined forwardly from the top rail to the bottom rail, and another similarly-arranged series of pairs of rods connecting the top rail with the back bottom rail, the back series of rods being arranged to cross the rods of the front series, substantially as described.

7. The combination of the top rail, the bottom rails, the diagonally-arranged rods connecting the top rail with the bottom rails, and hinge connections between the top rail and the diagonal rods.

8. The combination of the top rail, the bottom rails, the diagonally-arranged rods, connecting the top rail with the bottom rails, hinge connections between the rods and the top rail, and the removable braces connecting the bottom rails.

9. The combination of the top rail, the bottom rails, the wires Q' having coils adapted to fit over the bottom rails, the pegs projecting from the top and bottom rails, and the diagonally-arranged rods connecting the top and bottom rails, substantially as described.

In testimony whereof I have hereunto subscribed my name.

GILBERT D. YOUNG.

Witnesses:
DAVID P. MCCLELLAN,
B. W. MILLER.